Dec. 13, 1949     D. R. KNAPP     2,491,318
WHEEL TRUCK
Filed Nov. 8, 1946     2 Sheets-Sheet 1
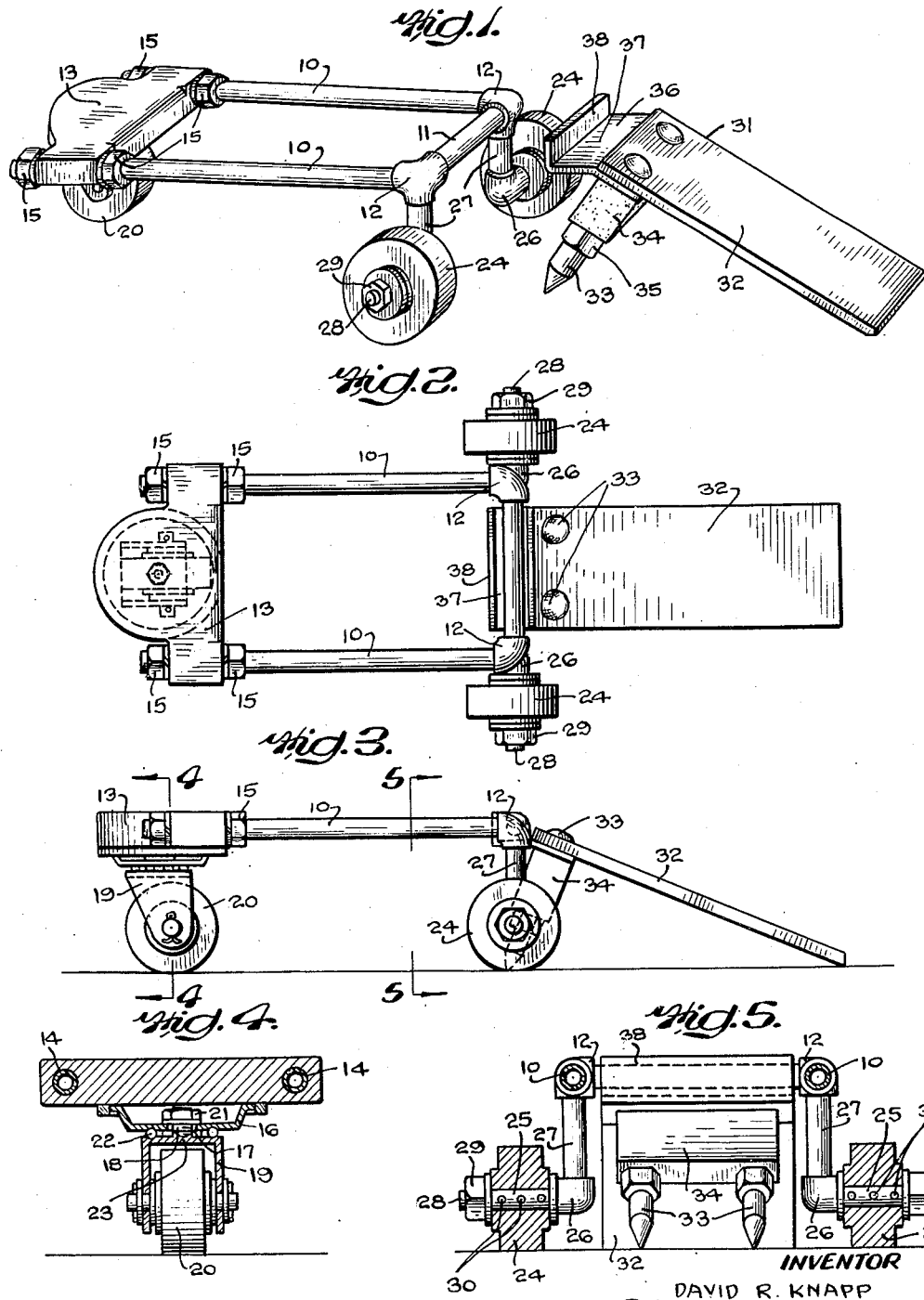
INVENTOR
DAVID R. KNAPP
BY
ATTORNEY

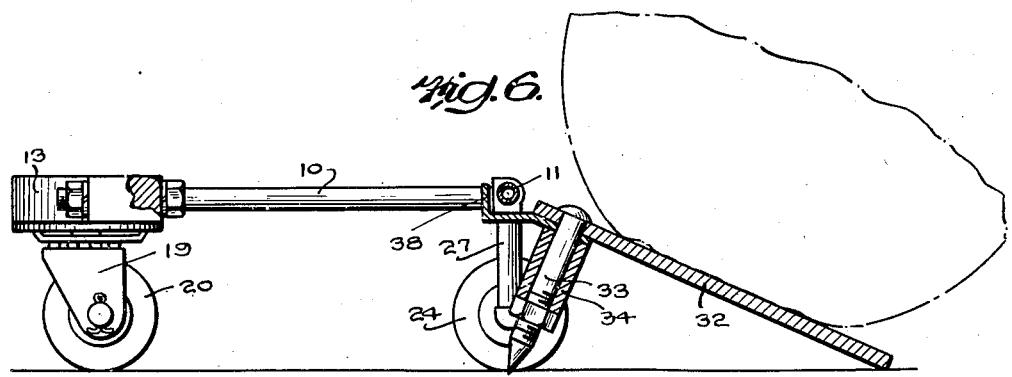
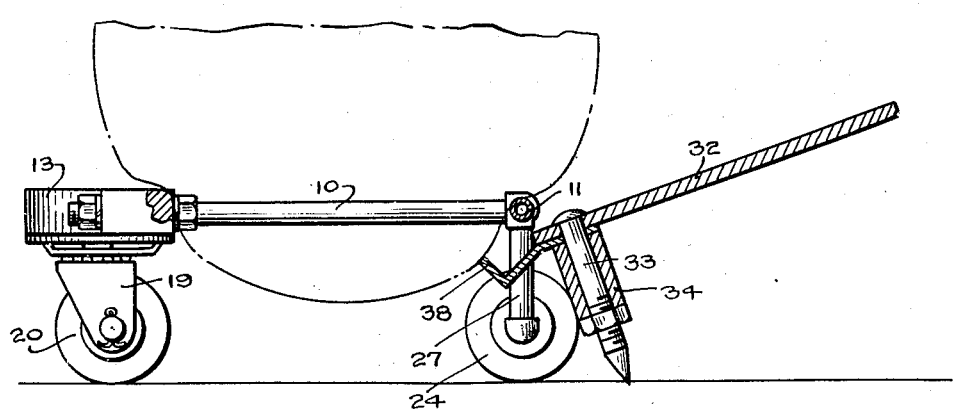
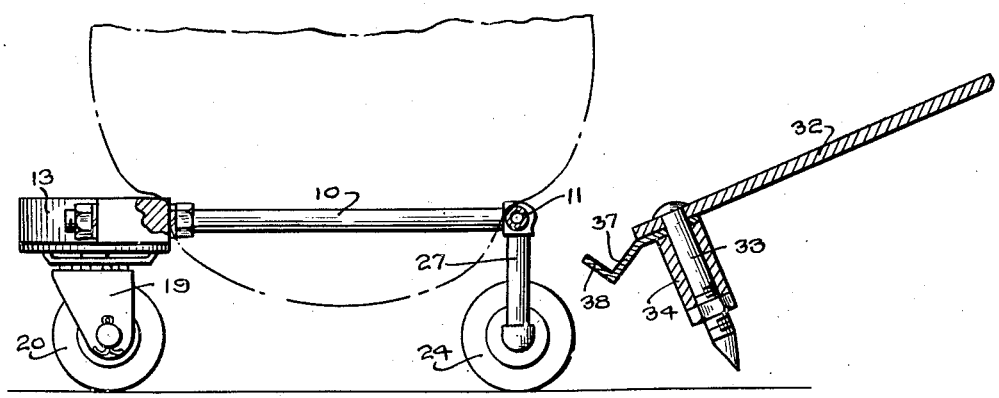

Patented Dec. 13, 1949

2,491,318

UNITED STATES PATENT OFFICE 2,491,318

WHEEL TRUCK

David R. Knapp, Atlantic Beach, Fla.; Ethel Tomlinson, Mae C. Finley, and Elmer W. Nittinger executors of said David R. Knapp, deceased Application November 8, 1946, Serial No. 708,622

3 Claims. (Cl. 214—38)

This invention relates generally to wheeled trucks and more particularly to a new and improved construction of emergency truck for supporting the wheel of a vehicle, disabled as by reason of a flat tire, so as to permit the vehicle to be driven under its own power or otherwise moved without damage to the wheel or tire.

Among the principal objects of the present invention is to provide a simple, inexpensive and exceedingly rugged and durable wheeled truck of the character aforesaid upon which the disabled vehicle wheel may be driven for cradled support thereby, the truck of the present invention being particularly characterized in that it is provided with a quick-detachable ramp which serves as an inclined run-way for elevating the disabled wheel to the height necessary to be positioned in the supporting cradle of the truck.

It is a further and important object of the present invention to so operatively associate the detachable ramp with the wheeled truck as to enable the disabled wheel of the vehicle either to be driven forwardly on to the truck or to be backed thereon, the ramp being provided with means which restrain the truck from moving relatively to the disabled wheel during the operation of loading the latter on the truck, as well as with means which operates automatically to release the ramp from its operative engagement with the truck when the same is loaded whereby the ramp may be removed bodily from the truck.

Still another and important object of the present invention is to construct the wheeled truck of the simplest form of structural elements whereby the same may be readily assembled in the form of an exceedingly simple unit having ample strength for its intended purposes, the unit being generally constructed of standard pipe stock secured together by conventional pipe fittings, such arrangement being particularly advantageous in that it permits the wheel shafts to be of hollow construction and thereby readily adapted for the internal reception of a wheel lubricant.

Other objects and advantages of the present invention will be apparent more fully hereinafter, it being understood that the said invention consists in the combination, construction, location and relative arrangement of parts, all as will be described in detail hereinafter, as shown in the accompanying drawings and as finally pointed out in the appended claims.

In the accompanying drawings which illustrate a preferred embodiment of the present invention, Figure 1 is a general perspective view of the wheeled truck and its associated ramp;

Figure 2 is a top plan view thereof;

Figure 3 is a side elevational view thereof;

Figure 4 is a transverse sectional view taken on the line 4—4 of Figure 3;

Figure 5 is a transverse sectional view taken on the line 5—5 of Figure 3;

Figure 6 is a side elevational view, partially in longitudinal section, showing the truck and ramp in position for the loading thereon of a disabled wheel of a vehicle;

Figure 7 is a view similar to Figure 6 showing the vehicle wheel in supported position on the truck; and Figure 8 is a further similar view showing the ramp detached from the wheeled truck.

Referring now to the drawings, it will be observed that the wheeled truck of the present invention comprises a horizontally disposed cradle-like frame composed of a pair of laterally spaced longitudinally extending standard pipe members 10—10 the rear ends of which are interconnected by a pipe member 11 by means of conventional pipe fittings 12—12 and the front ends of which project through and are interconnected by a plate 13. This plate 13 is preferably bored, as at 14—14, for free passage therethrough of the forward portions of the longitudinally extending side members 10—10 of the cradle frame, the said members being fixedly secured to the plate by means of nuts 15 threaded upon said members.

Suitably secured in any suitable manner to the bottom surface of the plate 13 is a swivel plate 16 the center of which is apertured, as at 17, for upward projection therethrough of the threaded shank 18 of a yoke 19 between the opposite sides of which is rotatably journalled a wheel 20. The yoke shank 18 is fitted at its upper end with a nut 21, and preferably the yoke is adapted for free movement about the vertical axis of said shank, such movement being facilitated by the interposition of suitable ball bearings 22 between the swivel plate 16 and the upper bridge part 23 of the yoke.

The rear end of the truck is provided with a pair of laterally spaced supporting wheels 24—24 which are respectively journalled for free rotation about a pair of oppositely projecting stub shafts 25—25 also formed of standard pipe stock, these stub shafts being respectively secured, as by means of the right angle pipe fittings 26—26, to the vertically extending pipe members 27—27 threaded into the bottom openings of the upper pipe fittings 12—12. The outer ends of the stub shafts 25—25 are preferably plugged, as at 28, so as to seal the hollow interior of said shafts and so provide a chamber for the reception of a lubricant, which is delivered to the internal bearing surfaces of the wheels 24—24 by way of ports 39 formed in the walls of the tubular stub shafts. The wheels 24—24, which are retained on their shafts by means of the retention nuts 29—29, are respectively spaced outwardly of the marginal side edges of the wheel-supporting cradle frame 10 and in addition are preferably provided with relatively wide traction rims, in consequence of which the wheeled truck is of substantial stability and not readily subject to cant laterally about the longitudinal axis of the frame. It will be noted that the construction is such as to leave clear and unimpeded the space extending vertically between the rear member 11 of the cradle frame and the ground surface and laterally between the vertically extending side members 27—27.

Adapted for operative association with the wheeled truck is a quick-detachable tail-gate or loading ramp unit 31 comprising an elongated flat number 32 of a width somewhat less than that of the cradle frame of the truck, said member 32 being provided at its leading end with a pair of laterally spaced ground-engaging stay pins 33—33. Preferably, in order to rigidify these pins, they are projected through a transverse block 34 which underlies the under surface of the member 32, the upper shank portions of the pins being externally threaded for reception of suitable locking nuts 35. Interposed between the member 32 and the block 34 is a connector member 36 having a portion 37 extending forwardly of the member 32, said portion being deflected below the plane of the member 32 and being provided at its free edge with an upwardly extending flange 38. As most clearly appears in Figure 2, the connector member 36 is of a width slightly less than the length of the transversely extending rear member of the wheeled truck measured between the fittings 12—12, the general construction and arrangement of the loading ramp being such as to permit the connector member 36 thereof to be quick-detachably engaged with said rear member 11 of the truck as shown in Figures 2, 3 and 6. It will be observed that when so connected to the truck, the ramp member 32 of the loading unit lies in an inclined plane with the pointed ends of the pins 33—33 in engagement with the ground and the flange 38 of the connector member disposed in advance of the rear member 11 of the truck.

In loading a disabled wheel into the cradle of the wheeled truck, the wheel with the flat tire, as illustrated by the dotted line representation in Figures 6, 7 and 8, is driven on to the inclined ramp 32 and thence into the truck cradle formed by the members 10, 11 and 13. Of course, for this loading operation the ramp is associated with the wheeled truck, as shown in Figure 6, in which condition the connector member 36 of the loading unit 31 underlies the rear transverse member 11 of the wheeled truck, while the pointed ends of the stay pins 33 are in engagement with the ground. The weight of the load upon the ramp 32 causes the pointed ends of the stay pins to dig into the ground and so prevents forward movement of the ramp and of the wheeled truck as the load is transferred from the ramp to the truck. In this connection, it will be apparent that the forward movement of the truck is restrained by reason of the interconnection between the upstanding flange 38 of the ramp and the transversely extending member 11 of the truck, this interconnection being in the form of a loose coupling which is automatically disconnected when the load is fully transferred to the wheeled truck, as shown in Figure 7, when the vehicle wheel with its flat tire is received within the cradle of the wheeled truck, the tread of the tire engages the upper edge of the coupling flange 38 and causes it to shift downwardly as the wheeled truck moves slightly forwardly and the ramp tilts about the pointed ends of the pins 33 into the raised inoperative position shown in Figure 7. In this latter position, the connector member 36 is fully disengaged from the transverse member 11 of the wheeled truck in consequence of which the loading unit 31 may be bodily removed from the truck. Figure 8 shows the loading unit completely disengaged from the truck.

Inasmuch as the loading unit is thus automatically tilted into position for ready removal from the truck by the weight of the load received on the truck, it is an exceedingly simple matter to effect complete removal of the loading unit from its operative association with the truck. Also, because the loading unit is thus readily removable from the truck, the device of the present invention is equally adaptable for receiving any disabled wheel of a vehicle by either moving the vehicle forwardly upon the ramp or by backing it upon the ramp, the subsequent removal of the loading ramp from the loaded truck making it possible to move the vehicle in either direction without any such interference as would be occasioned were the ramp, with its ground-gripping pins, to remain interconnected with the truck.

It will be understood, of course, that the apparatus of the present invention is susceptible of various changes and modifications which may be made from time to time without departing from the general principles and real spirit of the present invention and it is, accordingly, intended to claim the same broadly, as well as specifically, as indicated in the appended claims.

What is claimed as new and useful is:

1. A wheel truck of the character described comprising, in combination, a wheel supporting frame of open rectangular form having a transversely extending rear member, a swivelled wheel at the front end of the frame and a pair of laterally spaced wheels at the rear end of the frame for supporting the same elevated above the ground, a loading unit operatively associated with the truck including a loading ramp having a pair of ground-gripping pins at its forward end adapted to support said ramp in inclined position upon the ground with its forward end disposed approximately in the horizontal plane of the elevated frame and in close proximity to the rear member thereof, and means carried by said forward end of the loading ramp for effecting loose coupling thereof to said rear member of the frame, said means being operative to effect automatic uncoupling of the ramp from the frame by the load of the vehicle wheel supported by the frame.

2. In a wheel truck of the character defined in claim 1 wherein said loose-coupling means includes a hook-shaped member projecting forwardly of the loading ramp and having a terminal element adapted for disposition in advance of the rear member of the frame.

3. In a wheel truck of the character defined in claim 1 wherein said loose-coupling means includes a terminal element adapted for disposition in advance of the rear member of the frame when said loading ramp is disposed in its inclined loading position as aforesaid, said terminal element being engageable by the tire of the vehicle wheel supported in the frame to depress the same below said frame member and tilt said loading ramp into position to permit its free removal from said frame.

DAVID R. KNAPP.

REFERENCES CITED

The following references are of record in the file of this patent:

UNITED STATES PATENTS

| Number | Name | Date |
|---|---|---|
| 503,105 | Tingley | Aug. 8, 1893 |
| 976,889 | Lemke | Nov. 29, 1910 |
| 2,198,438 | Knapp | Apr. 23, 1940 |
| 2,350,118 | Knapp | May 30, 1944 |

FOREIGN PATENTS

| Number | Country | Date |
|---|---|---|
| 729,892 | France | May 3, 1932 |